United States Patent
Arai et al.

(10) Patent No.: US 6,804,441 B2
(45) Date of Patent: Oct. 12, 2004

(54) OPTICAL FIBER, OPTICAL FIBER COMPONENT AND OPTICAL TRANSMISSION METHOD

(75) Inventors: Shinichi Arai, Tokyo (JP); Naoto Oyama, Tokyo (JP); Hirofumi Saito, Tokyo (JP)

(73) Assignee: The Furukawa Electric Co., Ltd, Tokyo (JP)

( * ) Notice: Subject to any disclaimer, the term of this patent is extended or adjusted under 35 U.S.C. 154(b) by 248 days.

(21) Appl. No.: 10/207,020

(22) Filed: Jul. 30, 2002

(65) Prior Publication Data
US 2003/0108318 A1 Jun. 12, 2003

(30) Foreign Application Priority Data

Jul. 31, 2001 (JP) ........................................ 2001-231737
May 27, 2002 (JP) ........................................ 2002-152981

(51) Int. Cl.⁷ ................................................ G02B 6/22
(52) U.S. Cl. ........................ 385/123; 385/124; 385/127
(58) Field of Search .................................. 385/123–128

(56) References Cited

U.S. PATENT DOCUMENTS

| | | | | |
|---|---|---|---|---|
| 5,032,001 A | * | 7/1991 | Shang ........................ | 385/124 |
| 5,802,235 A | * | 9/1998 | Akasaka ..................... | 385/123 |
| 2002/0003938 A1 | * | 1/2002 | Srikant ........................ | 385/124 |
| 2003/0147610 A1 | * | 8/2003 | Tsukitani et al. ........... | 385/127 |
| 2004/0028364 A1 | * | 2/2004 | Moridaira et al. .......... | 385/127 |

OTHER PUBLICATIONS

Excerpt C–3–15 of the 1998 meeting of IEICE (The Institute of Electronics, Information and Communication Engineers), Sep. 29–Oct. 2, 1998, 3 pages.

* cited by examiner

*Primary Examiner*—Hemang Sanghavi
(74) *Attorney, Agent, or Firm*—Oblon, Spivak, McClelland, Maier & Neustadt, P.C.

(57) ABSTRACT

An optical fiber comprising a core and a cladding region which covers an outer periphery of the core, having a zero-dispersion wavelength in a wavelength range of 1.4 μm to 1.65 μm, and being in a single mode in that zero-dispersion wavelength, wherein $GeO_2$ is doped in the core in a quantity such that a relative refractive index difference of the core becomes not less than 1.8%, the cladding region includes first, second, and third cladding regions, and a refractive index of the second cladding region is smaller than those of the first cladding region and the third cladding region.

26 Claims, 6 Drawing Sheets

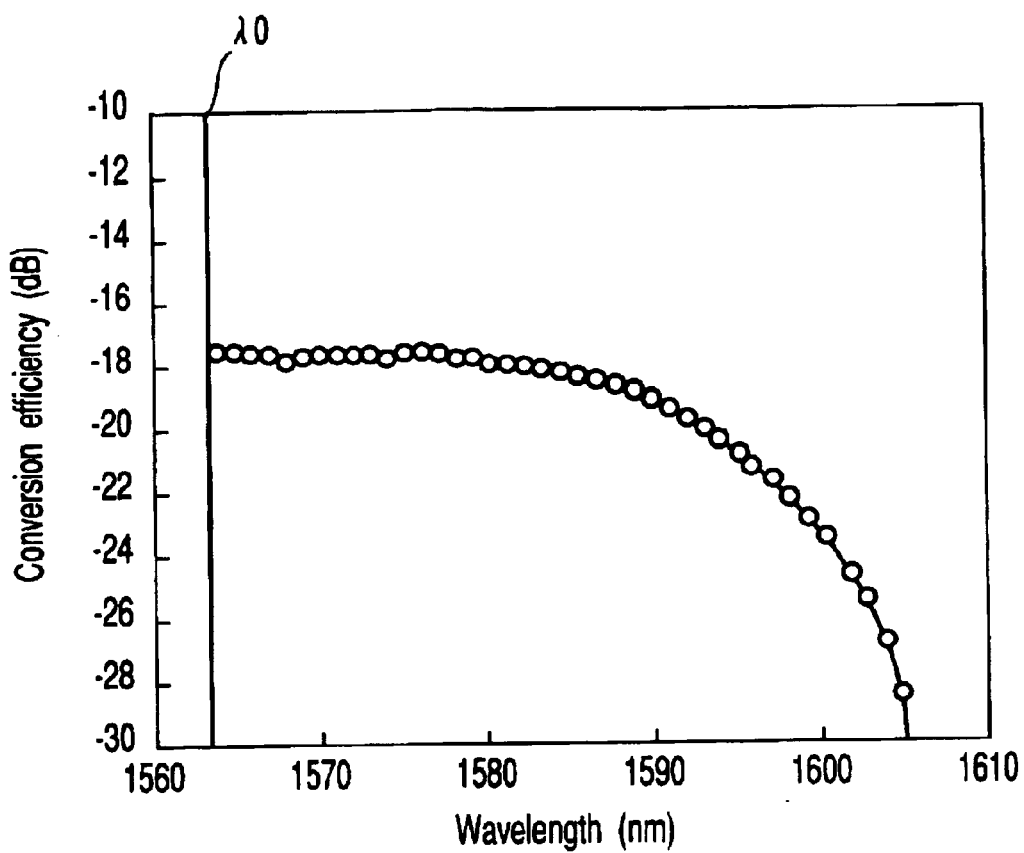
F I G. 5
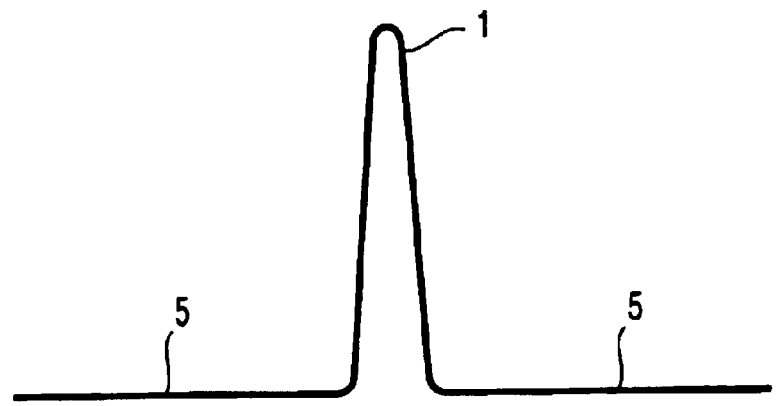
F I G. 6

OPTICAL FIBER, OPTICAL FIBER COMPONENT AND OPTICAL TRANSMISSION METHOD

CROSS-REFERENCE TO RELATED APPLICATIONS

This application is based upon and claims the benefit of priority from the prior Japanese Patent Applications No. 2001-231737, filed Jul. 31, 2001; and No. 2002-152981, filed May 27, 2002, the entire contents of both of which are incorporated herein by reference.

BACKGROUND OF THE INVENTION

1. Field of the Invention

The present invention relates to an optical fiber, an optical fiber component capable of efficiently inducing a non-linear phenomenon, and an optical transmission method.

2. Description of the Related Art

The quantity of communication information tends to exponentially increase with growth of the information society, and wavelength-division multiplexing transmission (WDM transmission) technology or the like has attracted attention with such increase in information. Wavelength-division multiplexing transmission is an optical transmission system suitable for mass high-speed communication since this is a system which transmits light having a plurality of wavelengths through one optical fiber.

The wavelength-division multiplexing transmission is currently carried out by applying an erbium doped optical fiber type optical amplifier (EDFA), and light which has a high output in a wavelength band used by the optical fiber can be obtained owing to advancement of this EDFA. A gain band of EDFA is typically a 1.55 μm wavelength band. It is to be noted that the 1.55 μm wavelength band indicates a wavelength band having the wavelength of approximately 1550 nm at the center, e.g., 1530 nm to 1570 nm.

There has been examined a technique which performs frequency conversion of signal light by utilizing a non-linear phenomenon generated in the optical fiber by using such light with a high output. This frequency conversion technique mainly utilizes a mixture of four light waves which is a non-linear phenomenon, and converts a wavelength of the signal light by causing the signal light whose wavelength is other than the zero-dispersion wavelength to enter the optical fiber having a function to induce the non-linear phenomenon while causing exciting light in the vicinity of the zero-dispersion wavelength of that optical fiber to enter the optical fiber. As the exciting light, light having a high output such as output light of the above-described EDFA is applied.

When the signal light having a longer wavelength than the zero-dispersion wavelength of the optical fiber is caused to enter the optical fiber while causing the exciting light to be incident on the optical fiber having a function to induce the non-linear phenomenon, it is converted into light having a shorter wavelength than the zero-dispersion wavelength. On the contrary, when the signal light having a shorter wavelength than the zero-dispersion wavelength of the optical fiber is caused to enter the optical fiber while causing the exciting light to be incident on the optical fiber having the function to induce the non-linear phenomenon, it is converted into light having a longer wavelength than the zero-dispersion wavelength.

The non-linear phenomenon which occurs in the optical fiber greatly depends on the intensity of the light entering the optical fiber, the spot size of light which is propagated in the optical fiber (effective core cross-sectional area), and the quantity of dopant such as $GeO_2$ existing in the area where the light is propagated.

That is, the non-linear phenomenon which occurs in the optical fiber is apt to be generated as the intensity of the light entering the optical fiber is higher, as the spot size of the light propagated in the optical fiber is smaller and as the quantity of the dopant existing in the area where the light is propagated is larger.

In order to utilize the above-described non-linear phenomenon, an optical fiber having, e.g., such a single-peaked index profile as shown in FIG. 6 is applied in the prior art. This optical fiber includes a core 1 consisting of a quartz-based material obtained by doping $GeO_2$ in the center and a cladding region 5 covering the circumference of the core 1, and the cladding region 5 is formed of pure quartz and has a uniform refractive index.

There has been conventionally examined for the frequency conversion application of the optical fiber having a small spot size of the light propagated in the optical fiber by increasing a concentration of the dopant ($GeO_2$) doped in the core 1 of such an optical fiber having a single-peaked optical index profile and increasing a difference in specific refraction index between the core 1 and the cladding region 5.

In the prior art optical fiber having the single-peaked index profile, however, in the case of trying to obtain the optical fiber having, e.g., the zero-dispersion wavelength in the wavelength 1.55 μm band which is the amplification band of EDFA, an effective cutoff wavelength of the optical fiber exceeds the 1.55 μm wavelength band when a difference in specific refractive index between the core and the cladding region is set equal to or larger than 2.3% by increasing the concentration of $GeO_2$ as shown in FIG. 7, and the single mode cannot be obtained in the optical fiber, thereby disabling efficient induction of the non-linear phenomenon.

Therefore, as described in the excerpt C-3-15 of the 1998 meeting of IEICE (the Institute of Electronics, Information and Communication Engineers), the optical fiber which has been conventionally proposed for induction of the non-linear phenomenon has a limit in the mold field diameter up to 4.6 μm and a difference in specific refractive index up to approximately 2.1%.

Further, as the wavelength band to be used enlarges, induction of the non-linear phenomenon on the wavelength side shorter than 1.55 μm is demanded, but the single-mode fiber cannot be obtained with the wavelength shorter than 1.55 μm in case of the above-described fiber. Therefore, a difference in the specific refractive index must be further lowered, but such a technique deteriorates the non-linearity of the fiber, which is not efficient.

Furthermore, when use of the four light wave mixing is attempted, the slope of the wavelength dispersion in the zero-dispersion wavelength and the wavelength band used is important, and the fiber with a smaller dispersion slope is demanded. As described in C-3-15 of the 1998 meeting of IEICE (the Institute of Electronics, Information and Communication Engineers), however, the dispersion slope is approximately 0.04 ps/nm$^2$/km, and further reduction in the dispersion slope is demanded. In the simple single-peaked index profile, however, further reduction in the dispersion inclination is difficult, and the conversion wavelength band is difficult to enlarge.

BRIEF SUMMARY OF THE INVENTION

It is an object of the present invention to provide an optical fiber capable of efficiently inducing the non-linear phenomenon.

It is another object of the present invention to provide an optical fiber component including an optical fiber capable of efficiently inducing the non-linear phenomenon.

It is a further object of the present invention to provide an optical transmission method using an optical fiber capable of efficiently inducing the non-linear phenomenon.

According to a first aspect of the present invention, there is provided an optical fiber comprising: a core; and a cladding region which covers the outer periphery of the core, having a zero-dispersion wavelength in a wavelength range of 1.4 μm to 1.65 μm, and being a single mode in the zero-dispersion wavelength, wherein $GeO_2$ is doped in the core in a quantity such that a relative refractive index difference of the core becomes not less than 1.8%, the cladding region includes a first cladding region which covers the outer periphery of the core, a second cladding region which covers the outer periphery of the first cladding region, and a third cladding region which covers the outer periphery of the second cladding region, and a refractive index of the second cladding region is smaller than that of the first cladding region and smaller than that of the third cladding region.

According to a second aspect of the present invention, there is provided an optical fiber comprising: a core; and a cladding region which covers the outer periphery of the core, having a zero-dispersion wavelength in a wavelength range of 1.4 μm to 1.65 μm, and being a single mode in the zero-dispersion wavelength, wherein $GeO_2$ is doped in the core in a quantity such that a relative refractive index difference of the core becomes not less than 1.8%, the cladding region includes a first cladding region which covers the outer periphery of the core and a second cladding region which covers the outer periphery of the first cladding region, and a refractive index of the first cladding region being smaller than that of the second cladding region.

According to a third aspect of the present invention, there is provided a quartz-based optical fiber which induces a non-linear phenomenon in the optical fiber, comprising: a core; and a cladding region which covers the outer periphery of the core, having a zero-dispersion wavelength in a wavelength range of 1.4 μm to 1.65 μm, and being a single mode in the zero-dispersion wavelength, wherein $GeO_2$ is doped in the core, a relative refractive index difference of the core is not less than 1.0%, the cladding region includes a first cladding region which covers the outer periphery of the core, a second cladding region which covers the outer periphery of the first cladding region, and a third cladding region which covers the outer periphery of the second cladding region, the second cladding region is arranged in a range which influences light propagated in the core, and a refractive index of the second cladding region being smaller than those of the first cladding region and the third cladding region.

According to a fourth aspect of the present invention, there is provided a quartz-based optical fiber with a W-shaped index profile, comprising: a core; a cladding region which covers the outer periphery of the core, having a zero-dispersion wavelength in a wavelength range of 1.4 μm to 1.65 μm, being in a single mode in the zero-dispersion wavelength, and inducing a non-linear phenomenon in the optical fiber, wherein $GeO_2$ is doped in the core, a relative refractive index difference of the core is not less than 1.0%, the cladding region includes first cladding region which covers the outer periphery of the core, a second cladding region which covers the outer periphery of the first cladding region and a third cladding region a third cladding region which covers the outer periphery of the second cladding region, the second cladding region is arranged in a range which influences light propagated in the core, and a refractive index of the first cladding region is smaller than that of the second cladding region.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a graph showing a frequency conversion efficiency when frequency conversion is carried out by using the optical fiber according to the third embodiment of the present invention;

FIG. 6 is an explanatory view showing a single-peaked refraction index profile of a prior art optical fiber;

DETAILED DESCRIPTION OF THE INVENTION

Figure 1A:
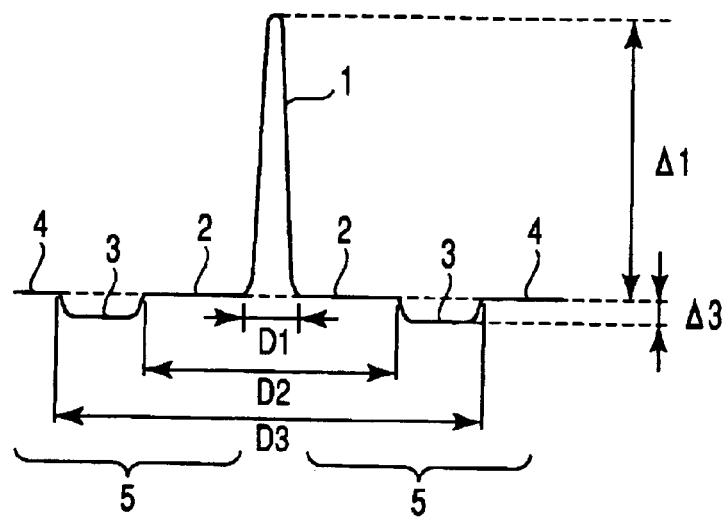
FIG. 1A is a view showing a refractive index profile of an optical fiber according to a first embodiment of the present invention.

In an optical fiber according to the first and second aspects of the present invention, a pair of stress imparting members which apply the stress to a core can be axisymmetrically arranged on the both sides of the core in a cladding region, thereby providing a property of maintaining linear polarized light. Further, a pair of materials having a linear expansion coefficient different from that of the cladding region, which apply the stress to the core, can be arranged on the both sides of the core in the cladding region, thereby giving the property of maintaining linear polarized light.

Furthermore, it is desirable that a zero-dispersion wavelength X nm and a relative refractive index difference Y % of the core satisfy the relationship of Y≧0.0100769263X−13.0945784381. When this relationship is satisfied, the single-mode operation is enabled, and the excellent non-linearity can be realized.

Moreover, according to the present invention, there is provided an optical fiber component which includes an optical fiber according to the first to fourth aspects and whose zero-dispersion wavelength fluctuates ±0.1 or more in the longitudinal direction of the optical fiber.

As described above, by causing the zero-dispersion wavelength to fluctuate ±0.1 nm or more in the longitudinal direction of the optical fiber, it is possible to reduce changes in generation efficiency of a non-linear phenomenon due to fluctuation in the zero-dispersion wavelength of the optical fiber itself resulting from small fluctuation in an exciting light wavelength or fluctuation in a temperature of the optical fiber, thereby improving the stability as a non-linear element.

In addition, according to the present invention, there is provided an optical fiber component to which a property of maintaining linear polarized light is given by winding the optical fiber according to the first to fourth aspects in the form of a coil.

Additionally, according to the present invention, there is provided an optical transmission method which uses the optical fiber according to the first to fourth aspects and is characterized in that a substance having an effect of amplifying signal light or generated light is added to the core, the non-linear phenomenon is induced by causing the exciting light and the signal light to enter the optical fiber and at least one of the signal light and the generated light caused by the non-linear phenomenon is amplified in the same optical fiber.

Further, according to the present invention, there is provided the optical transmission method which uses the optical fiber according to the first to fourth aspects and is characterized in that the non-linear phenomenon due to Raman amplification is induced by causing the exciting light and the signal light to enter the optical fiber and at least one of the signal light and the generated light caused by the non-linear phenomenon is amplified in the same optical fiber.

In the optical fiber according to the aspects of the present invention, $GeO_2$ whose quantity causes a relative refractive index difference of the core to be not less than 1.0% or more preferably not less than 1.8% is doped in the center of the core. A concrete quantity of $GeO_2$ to be doped in the core is, e.g., 15 to 30 mol %. Incidentally, although the upper limit of the relative refractive index difference of the core is not particularly restricted, it is 4.5%, for example.

Incidentally, the relative refractive index difference of the core means the relative refractive index difference between the core and the undoped material in the cladding region.

In the optical fiber according to the aspects of the present invention, the optical fiber according to the first and third aspects has a refractive index of the second cladding region set smaller than refractive indices of the first and third cladding regions, and the optical fiber according to the second and fourth inventions has a refractive index of the first cladding region set smaller than a refractive index of the second cladding region.

That is, the cladding region has a uniform refractive index in the prior art optical fiber examined for frequency conversion, whereas the cladding region partially has an area where the refractive index is small in the optical fiber according to the first to fourth aspects. This area (the second cladding region in the optical fiber according to the first and third aspects, and the first cladding region in the optical fiber according to the second and fourth aspects) will be referred to as a dip rest layer hereinafter.

In order to form an area where the refractive index is partially small to the cladding region, partially doping a substance which decreases the refractive index to the cladding region, e.g., doping fluorine or boron to the cladding region consisting of quartz-based glass can suffice.

According to the optical fiber defined in the aspects of the present invention, as described above, an LP11 mode which is a higher-order mode can be leaked to the dip rest layer so that the LP11 mode is incapable of propagation in the wavelength band used by the optical fiber by forming the dip rest layer in the cladding region, thereby obtaining a single mode. Furthermore, an effective core cross-sectional area of an LP01 mode which is a zero-order mode (propagation mode) is reduced, and $GeO_2$ can be doped to the core with a high concentration. Moreover, the zero-dispersion wavelength can be set to an appropriate wavelength in the wavelength band used by properly selecting a refractive index distribution.

Incidentally, in order to efficiently demonstrate the above-described advantages, the inside diameter of the second cladding region is formed so as to fall within a range which influences the higher-order mode light propagated in the core, namely, a range capable of leaking the higher-order mode and reducing the effective cutoff wavelength in the optical fiber according to the first to fourth aspects.

The optical fiber according to the aspects of the present invention has the high non-linearity which cannot be realized in the conventional single-peaked index profile and can realize the single mode in the wavelength band used by forming the dip rest layer to the cladding region and doping $GeO_2$ to the core with the high concentration. Therefore, the optical fiber according to the aspects of the present invention can efficiently induce the non-linear phenomenon and realize efficient frequency conversion.

In addition, as in the optical fiber according to the second and fourth aspects, in the case of the W-shaped index profile in which the first cladding region in contact with the core is the dip rest layer, the high non-linearity and the low-dispersion slope can be given to the optical fiber by controlling to the zero-dispersion wavelength matched with the exciting light (pumping light) wavelength.

Additionally, in the optical fiber according to the aspects of the present invention, fluctuation in non-linear phenomenon generation efficiency due to fluctuation of SOP (state of polarization) can be suppressed by applying the stress to the core to cause birefringence, imparting the property of maintaining linear polarized light and uniforming the states of polarization of the exciting light (pump beam) and the signal light entering the optical fiber. As means for applying the stress to the core, it is possible to arrange a member having a coefficient of linear expansion different from that of the cladding region on the both sides of the core of the optical fiber or form the fiber into a coil with a small diameter.

As the material having a coefficient of linear expansion different from that of the cladding region, it is possible to adopt a material obtained by doping $B_2O_3$ to the part of the cladding regions on the both sides of the core, for example. A quantity of $B_2O_3$ to be doped is, e.g., 14 to 24 mol %.

Various kinds of embodiments according to the present invention will now be described hereinafter with reference to the accompanying drawings. It is to be noted that the same reference numerals denote parts having the same names as those of the prior art example in description of the embodiments, thereby omitting a repetitive explanation.

Figure 1B:
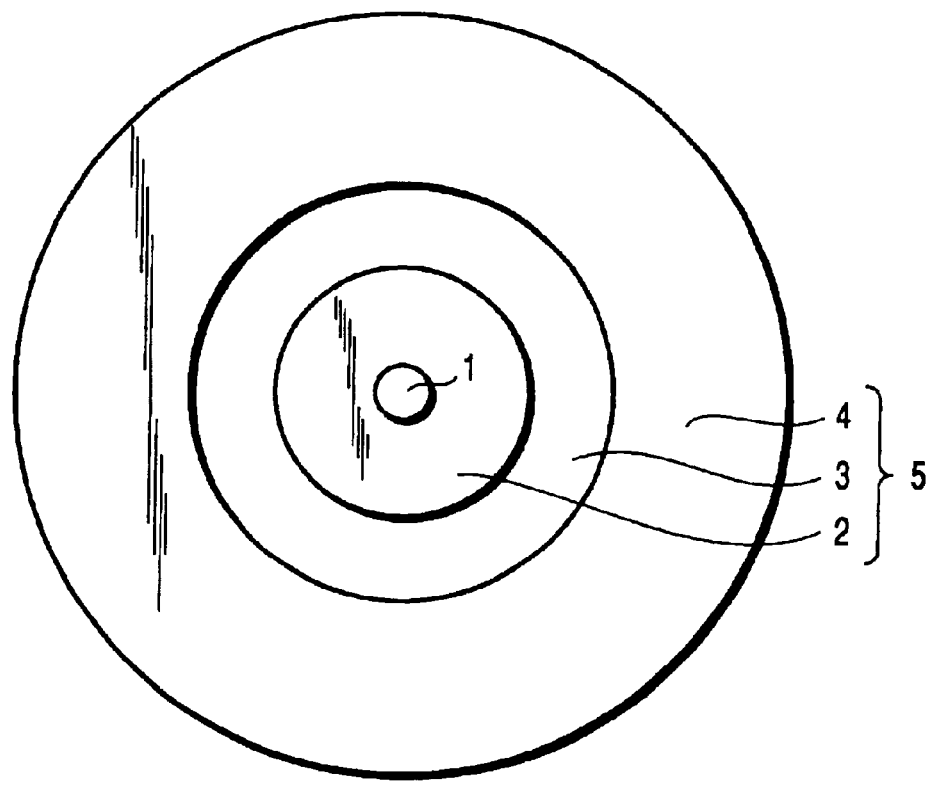
FIG. 1B is a transverse sectional view of the optical fiber according to the first embodiment of the present invention.

FIG. 1A shows a refractive index profile structure of an optical fiber according to a first embodiment of the present invention, and FIG. 1B shows a cross-sectional structure of the optical fiber according to the first embodiment.

As shown in the drawings, the optical fiber according to the first embodiment includes a core 1 and a cladding region 5 which covers the outer peripheral side of the core. To the core 1 is doped $GeO_2$ whose quantity causes a relative refractive index difference between the core 1 and the cladding region 5 to be not less than 1.8%. The cladding region 5 includes a first cladding region 2 which covers the outer peripheral side of the core 1 in contiguity with the core 1, a second cladding region 3 which covers the outer peripheral side of the first cladding region 2 in contiguity with the first cladding region 2, and a third cladding region 4 which covers the outer peripheral side of the second cladding region 3 in contiguity with the second cladding region 3.

Additionally, in this embodiment, the first cladding region 2 and the third cladding region 4 are formed of pure quartz, and the second cladding region 3 is formed by doping fluorine into pure quartz. Further, a refractive index of the second cladding region 3 is set smaller than that of the first cladding region 2 and smaller than that of the third cladding region 4. In other words, in this embodiment, the second cladding region 3 which is a dip rest layer is formed in the cladding region 5.

Furthermore, in this embodiment, although the cladding regions 2 and 4 have the same specific refractive index, it goes without saying that the advantage of this embodiment can be obtained when the specific refractive index of the cladding region 2 is different from that of the cladding region 4.

The second cladding region 3 which functions as the dip rest layer is formed in a range which influences higher-order mode light which is propagated in the core 1. That is, in the first embodiment, the second cladding region 3 is formed in a range that the higher-order mode is leaked and the cutoff wavelength of the optical fiber can be minimized. As a result, the optical fiber according to this embodiment has a zero-dispersion wavelength in a wavelength range of 1.4 μm to 1.65 μm and is in the signal mode in this zero-dispersion wavelength.

The first embodiment is constituted as described above, and the following table 1 shows a result of simulating the structure and the characteristic of an example in the first embodiment together with a comparative example. In the following table 1, the example 1 is an example according to the first embodiment, and the comparative example 1 is an example of the optical fiber having such a single-peaked refractive index profile as shown in FIG. 6.

TABLE 1

Structure and Characteristic of Fiber of Example 1

| | Δ1 (%) | Δ2 (%) | D2/D1 | D3/D1 | λc (nm) | DS @ 1550 nm (ps/ nm²/km) | MFD @ 1550 nm (μm) |
|---|---|---|---|---|---|---|---|
| Single-peaked type 1 | 2.5 | 0 | 0 | | 1563 | 0.054 | 4.32 |
| Example 1 | 2.5 | −0.8 | 2.5 | 3 | 1523 | 0.054 | 4.32 |

Incidentally, in the table 1, assuming that $n_1$ is a refractive index of the core 1, $n_3$ is a refractive index of the second cladding region 3 and $n_s$ is a refractive index of pure quartz when the refractive index in vacuum is 1, the respective relative refractive index differences Δ1 (relative refractive index difference of the core 1) and Δ3 (relative refractive index difference of the second cladding region 3) are defined by the following expressions (1) and (2). The units of the relative refractive index differences are both %.

$$\Delta 1 = \{(n_1^2 - n_s^2)/2n_1^2\} \times 100 \quad (1)$$

$$\Delta 3 = \{(n_3^2 - n_s^2)/2n_3^2\} \times 100 \quad (2)$$

Further, in the table 1 and each table shown below, D2/D1 indicates a ratio of a diameter of the first cladding region and a core diameter; D3/D1, a ratio of a diameter of the second cladding region and the core diameter; and λc, an effective cutoff wavelength (cutoff wavelength) obtained based on the bending method with a length of 2 m. Furthermore, Ds indicates a dispersion slope at the zero-dispersion wavelength (wavelength of 1.55 μm) when the wavelength of 1.55 μm is the zero-dispersion wavelength. MFD indicates a mode field diameter when the light having the wavelength of 1.55 μm is propagated.

Moreover, although not shown in table 1, the core diameter is set in both the example 1 and the comparative example 1 in such a manner that the wavelength dispersion at the wavelength of 1.55 μm becomes 0 ps/nm/km.

As apparent from the table 1, the optical fiber according to the embodiment 1 has a value of the same relative refractive index difference Δ1 as that of the optical fiber according to the comparative example 1, while shortening of the effective cutoff wavelength can be realized by the effect of the second cladding region 3 as the dip rest layer, which cannot be realized in the single-peaked optical fiber according to the comparative example 1, and the effective cutoff wavelength can be suppressed to the zero-dispersion wavelength (1550 nm) or a lower wavelength.

That is, the optical fiber according to the comparative example 1 has the effective cutoff wavelength of 1563 nm, and the problem is that the mode does not become single mode when performing frequency conversion in the wavelength band of 1.55 μm. However, since the effective cutoff wavelength of the optical fiber according to the example 1 can be reduced to 1523 nm, this optical fiber has the characteristic suitable for inducing the non-linear phenomenon in the optical fiber, and can efficiently perform frequency conversion in the wavelength band of 1.55 μm.

Figure 2A:
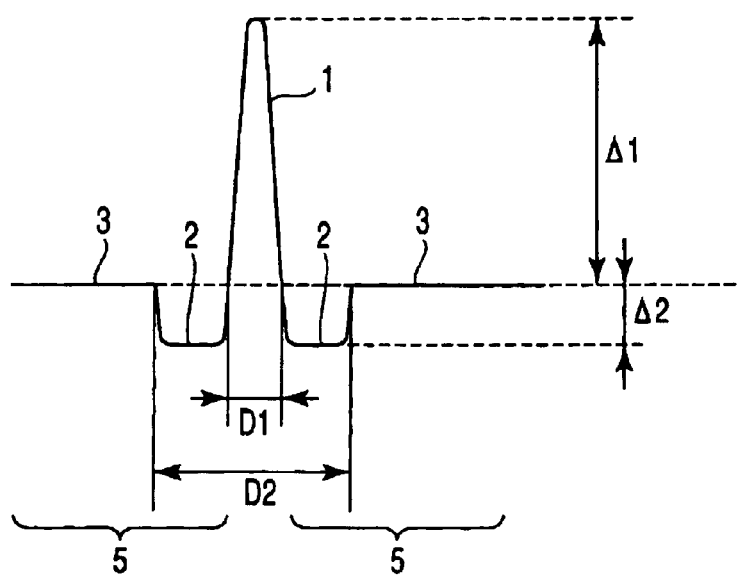
FIG. 2A is a view showing a refractive index profile of an optical fiber according to a second embodiment of the present invention.
Figure 2B:
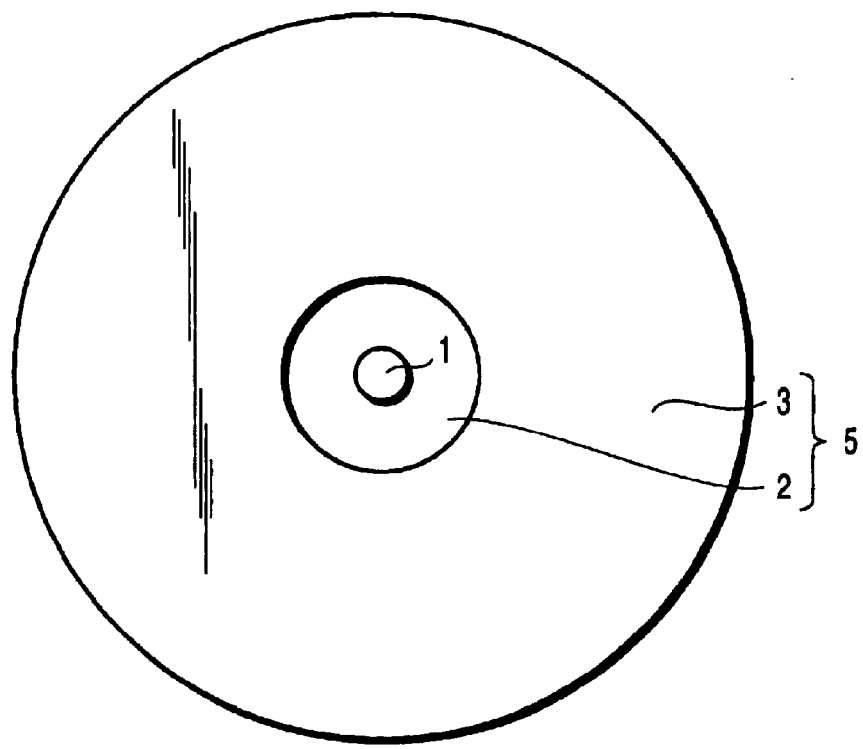
FIG. 2B is a transverse sectional view of the optical fiber according to the second embodiment of the present invention.
Figure 3:
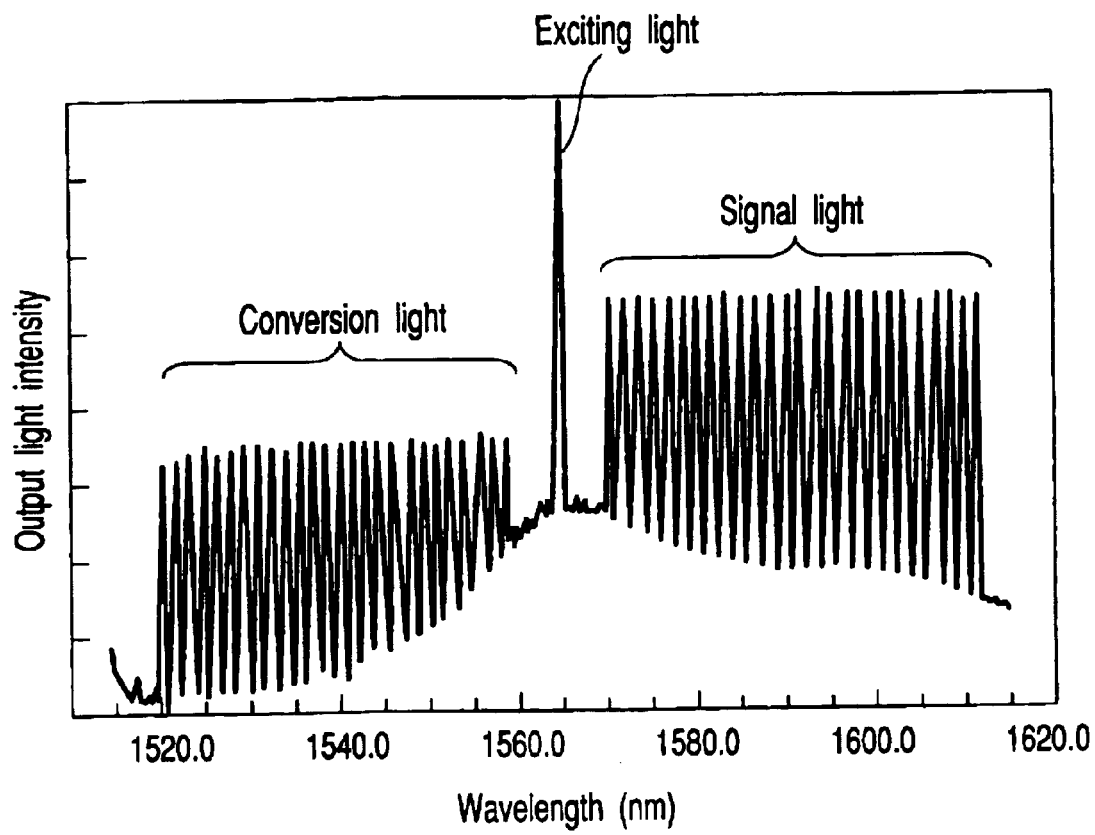
FIG. 3 is a graph showing an output light intensity after frequency conversion when frequency conversion is carried out by using the optical fiber according to the second embodiment of the present invention.

FIG. 2A shows a refractive index profile structure of the optical fiber according to a second embodiment of the present invention. In addition, FIG. 2B shows a cross-sectional structure of the optical fiber according to the second embodiment of the present invention.

As shown in these drawings, the optical fiber according to the second embodiment includes a core 1 and a cladding region 5 which covers the outer periphery of the core 1. To the center of the core 1 is doped GeO$_2$ whose quantity causes a relative refractive index difference of the core 1 to be not less than 1.8%. The cladding region 5 includes a first cladding region 2 which covers the outer peripheral side of the core 1 in contiguity with the core 1, and a second cladding region 3 which covers the outer peripheral side of the first cladding region 2 in contiguity with the first cladding region 2.

A refractive index of the first cladding region 2 is set smaller than that of the second cladding region 3, and the optical fiber according to the second embodiment has a W-shaped refractive index profile.

Additionally, the second cladding region 3 is formed in a range which influences the light propagated in the core 1. That is, in the second embodiment, the second cladding region 3 has a function to leak the higher-order mode and reduce the cutoff wavelength of the optical fiber. However, when the inside diameter of the second cladding region 3 is too large (when the outside diameter of the first cladding region 2 is too large), the refractive index profile approximates that of the single-peaked optical fiber, and hence the refractive index of the second cladding region 3 is formed in the above-described range.

The second embodiment is characterized to have the zero-dispersion wavelength in the wavelength range of 1.4 μm to 1.65 μm and enable the signal mode propagation in the zero-dispersion wavelength with the above-described structure, as similar to the first embodiment.

The second embodiment is configured as described above, and the following table 2 shows a result of simulating the structure and the characteristic of an example in the second embodiment together with a comparative example. In the following table 2, an example of the embodiment 2 is the second embodiment and the comparative example 2 is an example of the optical fiber having such a prior art single-peaked refractive index profile as shown in FIG. 6.

TABLE 2

Structure and Characteristic of Fiber of Example 2

|  | 1 (%) | 2 (%) | D2/D1 | λc (nm) | Ds @ 1550 nm (ps/nm$^2$/km) | MFD @ 1550 nm (μm) |
|---|---|---|---|---|---|---|
| Single-peaked type 2 | 3.25 | 0 | 0 | 1796 | 0.057 | 3.94 |
| Example 2 | 3.25 | −0.4 | 2 | 1499 | 0.052 | 3.74 |

Incidentally, in the above table 2 and each table shown below, assuming that n$_2$ is a refractive index of the first cladding region 2 and n$_s$ is a refractive index of pure quartz when a refractive index in vacuum is 1, a relative refractive index difference Δ2 is defined by the following expression (3). The unit of the relative refractive index difference Δ$_2$ is %.

$$\Delta 2 = \{(n_2^2 - n_s^2)/2n_2^2\} \times 100 \quad (3)$$

Further, although not shown in the table 2, the core diameter is set in such a manner that the wavelength dispersion in the wavelength 1.5 μm becomes 0 ps/nm/km in both the example 2 and the comparative example.

As apparent from the table 2, in the example 2, the refractive index of the first cladding region 2 is set smaller than that of the second cladding region 3, and reduction in wavelength of the effective cutoff wavelength ca be realized, which cannot be realized with the single-peaked optical fiber of the comparative example 2, while having a value of the same relative refractive index difference Δ1 as that of the comparative example 2 by the effect of the dip rest layer, thereby obtaining the effective cutoff wavelength which is not more than 1550 nm.

That is, the optical fiber according to the comparative example 2 has the effective cutoff wavelength of 1796 nm and has a problem that it does not enter the single mode when performing frequency conversion in the wavelength band 1.55 μm. However, since the optical fiber according to the example 2 can set the effective cutoff wavelength to 1499 nm, frequency conversion can be efficiently carried out in the wavelength band 1.55 μm. Furthermore, since both MFD and the wavelength dispersion slope are reduced in the optical fiber according to the example 2, it can be said that this optical fiber has the characteristic which is more suitable for inducing the non-linear phenomenon in the fiber.

As another example of the second embodiment, the following table 3 shows the structure and the characteristic of the optical fiber according to an example 3. The optical fiber according to the example 3 is an optical fiber experimentally manufactured by the present inventors, and values shown in the following table 3 are all measured values.

TABLE 3

Structure and Characteristic of Fiber of Example 3

|  | Δ1% | Δ2% | D2/D1 | λc nm | Ds @ 1550 nm ps/nm$^2$/km | MFD @ 1550 nm μm |
|---|---|---|---|---|---|---|
| Example 3 | 2.8 | −0.55 | 6.34 | 1430 | −0.033 | 3.9 |

It can be understood from the above table 3 that the optical fiber according to the example 3 can demonstrate the same advantage as that of the optical fiber according to the example 2. Furthermore, since the optical fiber according to the example 3 has a small mode field diameter and its dispersion slope in the wavelength band of 1.55 mm is 0.033 ps/nm$^2$/km which is smaller than a conventional limit value (0.04 ps/nm$^2$/km), this is the further suitable optical fiber as an optical fiber which can efficiently induce the non-linear phenomenon.

Figure 9:
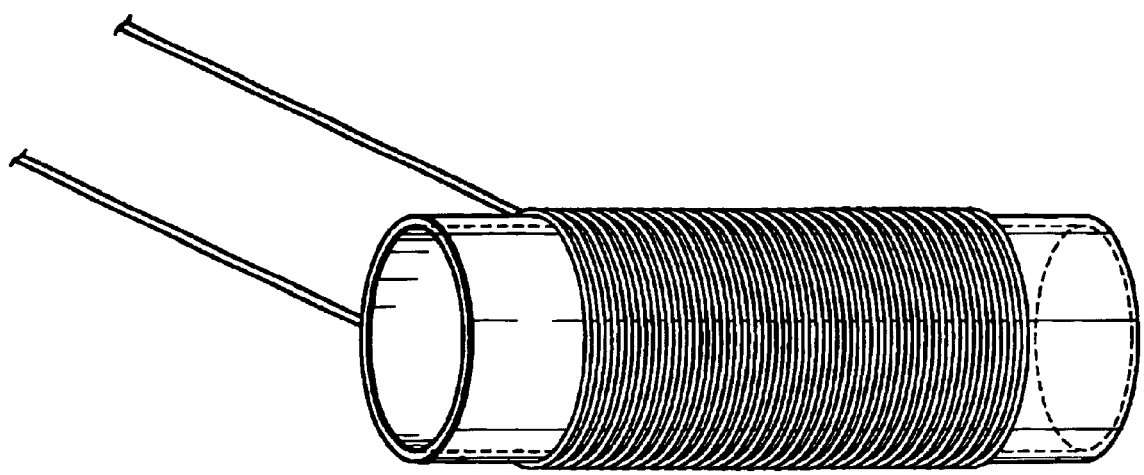
FIG. 9 is a view showing an optical fiber component formed by using the optical fiber according to the third embodiment of the present invention.

The present inventors manufactured such an optical fiber component as shown in FIG. 9 by winding the optical fiber according to the example 3 around a bobbin consisting of a quartz pipe having an outside diameter of 50 mmφ so as not to overlap the fiber (binding in the form of a coil), inducing birefringence to the optical fiber by bending and imparting a property of maintaining polarized wave light.

Moreover, the exciting light (pumping light) of +20 dBm is caused to enter this optical fiber component by using zero-dispersion wavelength of the optical fiber, and the signal light and the exciting light are caused to enter both the short wavelength side and the long wavelength side of this zero-dispersion wavelength with the states of polarization of the signal light and the exciting light being matched. When the frequency conversion function is confirmed, it is possible to collectively perform frequency conversion on both the short wavelength side and the long wavelength side with approximately 1564 nm which is the wavelength of the exciting light and the zero-dispersion wavelength of the optical fiber therebetween, and collective frequency conversion can be realized in the broad band of 91.3 m as a whole.

In addition, this optical fiber component can perform conversion and propagation of the light by having the property of maintaining polarized light as described above and matching the polarization states of the exciting light and the incident light.

Figure 4:
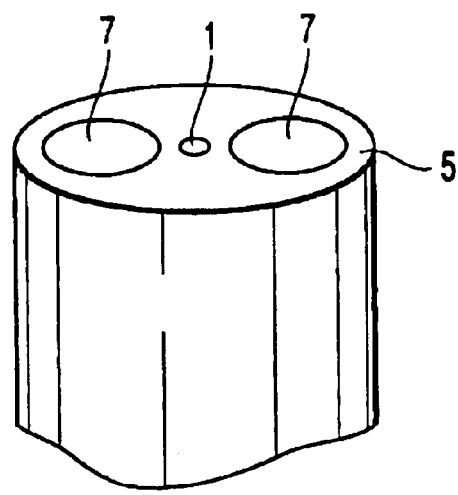
FIG. 4 is a perspective view showing a structure of an optical fiber according to a third embodiment of the present invention.
Figure 7:
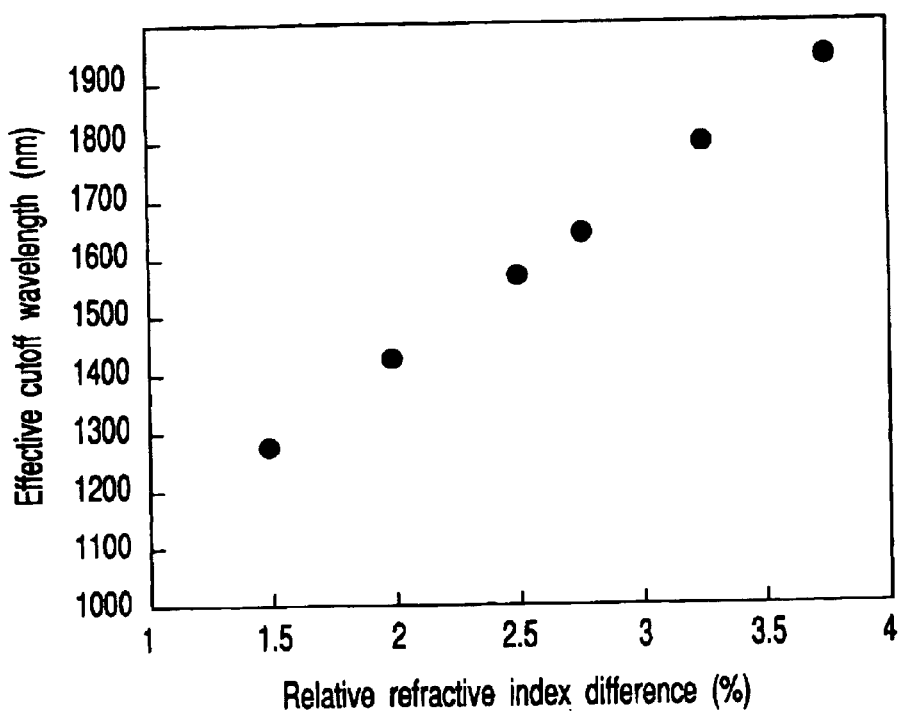
FIG. 7 is a graph showing an effective cutoff wavelength when a relative refractive index difference between a core and cladding region is changed in the optical fiber having the single-peaked refractive index profile.

FIG. 4 is a perspective view showing the structure of the optical fiber according to the third embodiment of the present invention. The third embodiment has a W-shaped refraction index profile structure similar to that of the second embodiment, and the third embodiment is characteristically different from the second embodiment in that a pair of stress imparting members 7 which apply the stress to the core 1 so as to sandwich the core 1 from the both sides are provided in the cladding region 5 and there is provided a mechanism of maintaining polarized light in which a pair of the stress imparting members 7 are formed so as to be axisymmetrical to the core 1.

The stress imparting member 7 is formed of quartz glass obtained by doping $B_2O_3$ (quantity of doping: 19.5 mol %), and the optical fiber according to the third embodiment is a PANDA type constant polarization optical fiber obtained by forming this stress imparting member 7.

The optical fiber according to the third embodiment is configured as described above, and the following table 4 shows a result of simulating the structure and the characteristic of the optical fiber according to an example 4 as a concrete example of the third embodiment. It is to be noted that an extinction ratio is a value obtained at the wavelength of 1540 nm.

TABLE 4

Structure and Characteristic of Fiber of Example 4

| | Δ1% | Δ2% | D2/D1 | λc nm | Ds @ 1550 nm ps/nm²/km | MFD @ 1550 nm μm | Extinction ratio @ 1540 nm dB/100 m |
|---|---|---|---|---|---|---|---|
| Example 4 | 2.0 | −0.4 | 1.43 | 1450 | −0.030 | 4.7 | −31 |

Additionally, FIG. 5 shows a result of performing frequency conversion by using the optical fiber according to the example 4. This frequency conversion was carried out by causing the exciting light of +20 dBm having 1563.08 nm which is the zero-dispersion wavelength (λ0) of the optical fiber according to the example 4 to enter the optical fiber having the length of 100 m according to the example 4 and causing the signal light to enter both the short wavelength side and the long wavelength side of this zero-dispersion wavelength.

As a result, frequency conversion on both the short wavelength side and the long wavelength side with the zero-dispersion wavelength therebetween was collectively carried out, and collective frequency conversion was able to be realized in the broad band of approximately 62 nm as a whole as shown in FIG. 5. Incidentally, although FIG. 5 shows only the conversion efficiency on the long wavelength side after frequency conversion, a similar result was obtained with respect to the conversion efficiency on the short wavelength side.

The present invention is not restricted to the foregoing embodiments and other various modifications can be made. For example, detailed values such as the respective relative refractive index differences Δ1, Δ2 and Δ3 of the optical fiber, the core diameter, the diameter of the first cladding region, the diameter of the second cladding region, the diameter of the third cladding region and others are not restricted to the values in the foregoing examples, and they are appropriately set in such a manner that the zero-dispersion wavelength is provided in the wavelength range of 1.4 μm to 1.65 μm and the single mode can be obtained in that zero-dispersion wavelength.

For example, in the structure that the cladding region 5 has the first to third cladding regions as in the first embodiment, the first cladding region 2 and the third cladding region 4 are formed so as to have the same refractive index in the first embodiment, but the refractive index of the first cladding region 2 may be set larger than that of the third cladding region or, contrarily, the refractive index of the first cladding region 2 may be set smaller than that of the third cladding region 4.

Figure 8:
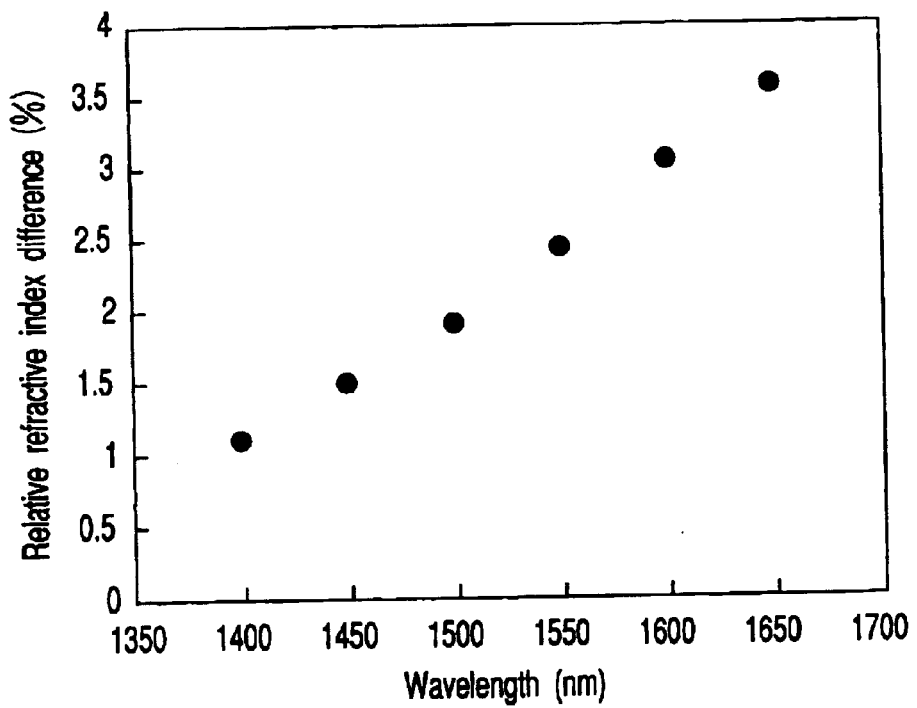
FIG. 8 is a graph showing the relationship between a zero-dispersion wavelength, an effective cutoff wavelength and a relative refractive index difference between a core and cladding region when the relative refractive index difference is changed while matching the zero-dispersion wavelength with the effective cutoff wavelength in the optical fiber having the single-peaked refractive index profile.

Further, as shown in FIG. 8, when the effective cutoff wavelength is shorter than the zero-dispersion wavelength× nm and the relationship with the relative refractive index difference Y % of the core satisfies the relationship of Y≧0.0100769263X−13.0945784381, the effective cutoff wavelength becomes larger than the zero-dispersion wavelength in the conventional single-peaked index profile, which is not effective. However, the single-mode operation is enabled in such an area by applying the above-described embodiments according to the present invention, and the excellent non-linearly can be realized.

In the state that the higher-order mode can be slightly propagated in the vicinity of the zero-dispersion wavelength, the single-mode operation is enabled by the technique such as winding to the minor diameter, but the generated light due to the non-linear phenomenon appears on the both sides of the zero-dispersion wavelength in a relatively wide wavelength band. Therefore, winding in the form of a coil is effective in order to cause the generated light to perform the single-mode operation.

Furthermore, it is also effective to cause the zero-dispersion wavelength of the optical fiber component constituted by the optical fiber according to the present invention to fluctuate ±0.1 nm or more in the longitudinal direction. As compared with the case that the uniform zero-dispersion wavelength is provided in the longitudinal direction of the optical fiber and the exciting light is inputted to an optimum wavelength, the efficiency of the non-linear phenomenon generated in the fiber is deteriorated but changes in efficiency of occurrence of the non-linear phenomenon due to minute fluctuation of the exciting light wavelength or fluctuation of the zero-dispersion wavelength of the fiber itself owing to a change in temperature of the fiber can be reduced if the zero-dispersion wavelength fluctuates. Therefore, in actuality, the stability as the non-linear element can be improved. Using this technique can thus greatly improve the actual reliability.

Moreover, in the above examples, description has been given on the cases where the optical fiber or the optical fiber component is used for frequency conversion, but the optical fiber and the optical fiber component according to the present invention may have functions of both frequency conversion and light amplification. For example, a substance having the amplification characteristic, e.g., $Er^{3+}$ can be doped into the core 1 together with $GeO_2$, the exciting light and the signal light can be caused to be incident while using the optical fiber as an amplification medium in order to induce the non-linear phenomenon, or Raman amplification can be carried out while performing frequency conversion based on the four light wave mixing.

In addition, it is also preferable to slightly vary the zero-dispersion wavelength of the optical fiber according to the present invention in the longitudinal direction of the optical fiber in order to cope with fluctuation in wavelength of the exciting light.

Additionally, although the first cladding region 2 and the third cladding region 4 are pure quartz in the first embodiment and the second cladding region 3 is pure quartz in the second to fourth embodiments, various kinds of dopant may be added to these regions in order to control the relative refractive index difference.

Further, in the optical fiber having the zero-dispersion in the range of 1.4 to 1.65 μm, causing the exciting (pumping) light having the substantial zero-dispersion wavelength to enter can obtain the effective characteristic when performing frequency conversion on both sides of that zero-dispersion wavelength. At this moment, both the signal (probe) light and the conversion (idler) light must be in the single mode. Typically, frequency conversion of 45.65 nm or higher is possible on one side with respect to the exciting light which has entered in the vicinity of the zero-dispersion.

In the single-peaked optical fiber, as shown in FIG. 8, when the zero-dispersion wavelength is set on the short wavelength side, the relative refractive index difference of the core must be decreased in order to realize the single mode with the zero-dispersion wavelength. In particular, assuming that the optical fiber having the zero-dispersion wavelength of 1.4 μm is used with the exciting light being caused to be incident thereon, the advantage of the present invention can be obtained when the relative refractive index difference of the core is substantially not less than 1.0%.

As described above in detail, according to the present invention, by forming an area where the refractive index is small (dip rest layer) in the cladding region which covers the core and doping $GeO_2$ with a high concentration into the core, the high non-linearity which cannot be realized in the conventional single-peaked index profile can be provided, and an optical fiber in the single mode can be obtained in the wavelength band used. The optical fiber according to the present invention can efficiently induce the non-linear phenomenon and realize efficient frequency conversion.

Furthermore, in the optical fiber according to the present invention, light can be converted and propagated while holding the polarization state of the incident light with the structure that a pair of stress imparting members are formed so as to be axisymmetrical to the core, as the polarized wave holding mechanism.

Moreover, according to the optical fiber component of the present invention, giving the polarized wave holding function to the optical fiber by winding the optical fiber in the form of a coil can perform conversion and propagation of the light while maintaining the polarization state of the incident light.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An optical fiber comprising: a core; and a cladding region which covers an outer periphery of said core, having a zero-dispersion wavelength in a wavelength range of 1.4 μm to 1.65 μm, and being in a single mode in said zero-dispersion wavelength, wherein $GeO_2$ is doped in said core in a quantity such that a relative refractive index difference of said core becomes not less than 1.8%, said cladding region includes a first cladding region which covers an outer periphery of said core, a second cladding region which covers an outer periphery of said first cladding region and a third cladding region which covers an outer periphery of said second cladding region, and a refractive index of said second cladding region is smaller than those of said first cladding region and said third cladding region.

2. The optical fiber according to claim 1, wherein a pair of stress imparting members which apply stress to said core are axisymmetrically arranged on both sides of said core in said cladding region, thereby imparting a property of maintaining linear polarized light.

3. An optical fiber comprising: a core; and a cladding region which covers an outer periphery of said core, having a zero-dispersion wavelength in a wavelength range of 1.4 μm to 1.65 μm, and being in a single mode in said zero-dispersion wavelength, wherein $GeO_2$ is doped in said core in a quantity such that a relative refractive index difference of said core becomes not less than 1.8%, said cladding region includes a first cladding region which covers an outer periphery of said core and a second cladding region which covers an outer periphery of said first cladding region, and a refractive index of said first cladding region is smaller than that of said second cladding region.

4. The optical fiber according to claim 3, wherein a pair of stress imparting members which apply stress to said core are axisymmetrically arranged on both sides of said core in said cladding region, thereby imparting a property of maintaining linear polarized light.

5. A quartz-based optical fiber which induces a non-linear phenomenon in said optical fiber, comprising: a core; and a cladding region, having a zero-dispersion wavelength in a wavelength range of 1.4 μm to 1.65 μm, and being in a single mode in said zero-dispersion wavelength, wherein $GeO_2$ is doped in said core, a refractive index of said core is not less than 1.0%, said cladding region includes a fist cladding region which covers an outer periphery of said core, a second cladding region which covers an outer periphery of said first cladding region and a third cladding region which covers an outer periphery of said second cladding region, said second cladding region is arranged in a range which influences light propagated in said core, and a refractive index of said second cladding region is smaller than those of said first cladding region and said third cladding region.

6. The optical fiber according to claim 5, wherein a pair of members formed of material having a coefficient of linear expansion different from that of said cladding region, which apply stress to said core, are arranged on both sides of said core in said cladding region, thereby imparting a property of maintaining linear polarized light.

7. The optical fiber according to claim 5, wherein said zero-dispersion wavelength X nm and a relative refractive index difference Y % of said core satisfy the relationship of $Y \geq 0.0100769263X - 13.0945784381$.

8. A quartz-based optical fiber having a W-shaped index profile, which induces a non-linear phenomenon in said optical fiber, comprising: a core; and a cladding region which covers an outer periphery of said core, having a zero-dispersion wavelength in a wavelength range of 1.4 μm to 1.65 μm, and being in a signal mode in said zero-dispersion wavelength, wherein $GeO_2$ is doped in said core, a relative refractive index difference of said core is not less than 1.0%, said cladding region includes a first cladding region which covers an outer periphery of said core, a second cladding region which covers an outer periphery of said first cladding region and a third cladding region which covers an outer periphery of said second cladding region, said second cladding region is arranged in a range which influences light propagated in said core, and a refractive index of said first cladding region is smaller than that of said second cladding region.

9. The optical fiber according to claim 8, wherein a pair of members formed of material having a coefficient of linear expansion different from that of said cladding region, which apply stress to said core, are arranged on both sides of said core in said cladding region, thereby imparting a property of maintaining linear polarized light.

10. The optical fiber according to claim 8, wherein said zero-dispersion wavelength X nm and a relative refractive index difference Y % of said core satisfy the relationship of $Y \geq 0.0100769263X - 13.0945784381$.

11. An optical fiber component comprising said optical fiber defined in claim 1, wherein said zero-dispersion wavelength fluctuates ±0.1 nm or more in the longitudinal direction of said optical fiber.

12. An optical fiber component comprising said optical fiber defined in claim 3, wherein said zero-dispersion wavelength fluctuates ±0.1 nm ore more in the longitudinal direction of said optical fiber.

13. An optical fiber component comprising said optical fiber defined in claim 5, wherein said zero-dispersion wavelength fluctuates ±0.1 nm or more in the longitudinal direction of said optical fiber.

14. An optical fiber component comprising said optical fiber defined in claim 8, wherein said zero-dispersion wavelength fluctuates ±0.1 nm or more in the longitudinal direction of said optical fiber.

15. An optical fiber component to which a property of maintaining linear polarized light is given by winding said optical fiber defined in claim 1 in the form of a coil.

16. An optical fiber component to which a property of maintaining linear polarized light is given by winding said optical fiber defined in claim 3 in the form of a coil.

17. An optical fiber component to which a property of maintaining linear polarized light is given by winding said optical fiber defined in claim 5 in the form of a coil.

18. An optical fiber component to which a property of maintaining linear polarized light is given by winding said optical fiber defined in claim 8 in the form of a coil.

19. An optical transmission method which uses said optical fiber defined in claim 1, wherein a substance having an amplification effect for signal light or generated light is added to said core, exciting light and signal light are caused to enter said optical fiber to induce a non-linear phenomenon, and amplification of at least one of said signal light and said generated light due to said non-linear phenomenon is carried out in the same optical fiber.

20. An optical transmission method which uses said optical fiber defined in claim 3, wherein a substance having an amplification effect for signal light or generated light is added to said core, exciting light and signal light are caused to enter said optical fiber to induce a non-linear phenomenon, and amplification of at least one of said signal light and said generated light due to said non-linear phenomenon is carried out in the same optical fiber.

21. An optical transmission method which uses said optical fiber defined in claim 5, wherein a substance having an amplification effect for signal light or generated light is added to said core, exciting light and signal light are caused to enter said optical fiber to induce a non-linear phenomenon, and amplification of at least one of said signal light and said generated light due to said non-linear phenomenon is carried out in the same optical fiber.

22. An optical transmission method which uses said optical fiber defined in claim 8, wherein a substance having an amplification effect for signal light or generated light is added to said core, exciting light and signal light are caused to enter said optical fiber to induce a non-linear phenomenon, and amplification of at least one of said signal light and said generated light due to said non-linear phenomenon is carried out in the same optical fiber.

23. An optical transmission method which uses said optical fiber defined in claim 1, wherein exciting light and signal light are caused to enter said optical fiber to induce a non-linear phenomenon based on Raman amplification, and amplification of at least one of said signal light and said generated light due to said non-linear phenomenon is carried out in the same optical fiber.

24. An optical transmission method which uses said optical fiber defined in claim 3, wherein exciting light and signal light are caused to enter said optical fiber to induce a non-linear phenomenon based on Raman amplification, and amplification of at least one of said signal light and said generated light due to said non-linear phenomenon is carried out in the same optical fiber.

25. An optical transmission method which uses said optical fiber defined in claim 5, wherein exciting light and signal light are caused to enter said optical fiber to induce a non-linear phenomenon based on Raman amplification, and amplification of at least one of said signal light and said generated light due to said non-linear phenomenon is carried out in the same optical fiber.

26. An optical transmission method which uses said optical fiber defined in claim 8, wherein exciting light and signal light are caused to enter said optical fiber to induce a non-linear phenomenon based on Raman amplification, and amplification of at least one of said signal light and said generated light due to said non-linear phenomenon is carried out in the same optical fiber.

* * * * *